United States Patent [19]
Henry

[11] Patent Number: 4,638,660
[45] Date of Patent: Jan. 27, 1987

[54] BASIC FLIGHT INSTRUMENT

[76] Inventor: Richard D. Henry, Box 331-A, Clinton, Pa. 15026

[21] Appl. No.: 816,453

[22] Filed: Jan. 6, 1986

[51] Int. Cl.⁴ .............................................. G01C 21/00
[52] U.S. Cl. .................................................. 73/178 R
[58] Field of Search ............. 73/178 R, 178 T, 178 H, 73/182, 180

[56] References Cited

U.S. PATENT DOCUMENTS

| | | | |
|---|---|---|---|
| 3,162,834 | 12/1964 | Schweighofer et al. | 73/178 R |
| 3,564,890 | 2/1971 | Catapano | 73/178 R |
| 4,598,582 | 7/1986 | Henry | 73/178 R |

*Primary Examiner*—Donald O. Woodiel

[57] ABSTRACT

A basic flight instrument to provide the pilot the means, by which, he can easily remain upright during instrument conditions. This flight instrument will be highly trustworthy, in that it will be absolutely tumble free due to its basic input derivatives. The instrument will be provided with two separate erection systems, whereby, the roll erection system will consist of a gimbal cage, spring tension erected and the pitch erection system will consist of a drum, the rotation of which will be properly erected by means of a gravitational weight and rotational reversing system. The pilot will be provided with simultaneous display of roll and pitch of reliable derivative. The roll rate of the gyro may be speed and altitude compensated if desired.

5 Claims, 6 Drawing Figures

BASIC FLIGHT INSTRUMENT

BACKGROUND OF THE INVENTION

The trustworthiness of the rate gyro is well known, its lack of pitch indication is likewise well known, therefore, the need for rate gyro information and pitch information portrayal upon the same instrument face should be obvious. Most pilots concede to the difficulty of use of the rate gyro alone therefore the combination is therefore all the more imperative. This instrument is a natural evolution of my prior patent applications of rate gyros in combination with pitch information on a single display, non-tumbling, of basic derivitive to be sure, therefore, reference thereto should guarantee avoidance of the dreaded graveyard spiral and or the recovery therefrom.

NOTE: The pitch erection system is subject to error due to centrifugal force during turns but only minor during shallow banked turns. Major errors only exist during steep banked turns. Giving due consideration to the error of encounter, it is a small price to pay to achieve pitch information of non tumbling derivitive portrayed in combination with a rate gyro, said rate gyro likewise being of non tumbling derivitive. Additional errors of encounter will be due to forces of inertia during periods of acceleration or deacceleration but will quickly subside proportional to the rate of speed stabilization. Likewise this is a small price to pay. It should be noted that earth reference gyros are plagued by the exact same problems unless equipped with erection cut out systems, then if so, they are subject to possibilities of free drift encounter, said free drift encounter more prevalent due to shallow banked turns the result of which will be erroneous erection into dynamic gravity due to lack of erection cut out.

OBJECTS OF THE INVENTION

The primary object of the present invention is to provide the pilot of an aircraft with a pictorial display flight instrument of similar display to that which most pilots prefer, that being a Gyro Horizon, but, this new invention will be by far more trustworthy due to its non-drifting, non-tumbling basic derivative. A further object of the present invention is to provide a simplified system for the speed compensation of the rate gyro as is necessary if a high degree of congruency is desired, wherein, by its use the sky earth demarcation line of of the indicator will remain more closely congruent to that of the natural horizon. A further object of the present invention is to provide a simplified system for the altitude compensation of the rate gyro, wherein, by its use, further improvement in the predescribed congruency is achieved. The need for the predescribed is easily understood should one examine the difference of the circumferences of the circles circumscribed by an aircraft for a given rate of turn, one circle being at high speed and the other circle being at low speed. It now becomes obvious that if an aircraft is to maintain a given rate of turn, then, if the speed of the craft should increase then the bank angle likewise must increase, conversely, should the airspeed decrease then the bank angle likewise must decrease if we are to maintain that given rate of turn. Altitude compensation should now become obvious due to a well known fact that near sea level indicated airspeed and true airspeed are nearly matched but at high altitudes, indicated airspeed and true airspeed are widely divergent, therefore, altitude compensation may be desirable if the aircraft is operable at high altitudes. A further object of the present invention is the amplification of the indication of pitch if amplification is desired which obviously would provide the pilot with ease of use to achieve more precise control.

DRAWINGS

FIG. 1 is a side view of the basic flight instrument internal parts, the enclosure case being in section, said view portraying the gyro, its gimbal cage, the cage erection spring and the cage limit stop. The view also vividly portrays the pitch erection system, its weighted drive gear and the geared driven indicator drum. The view also portrays the pitch erection system, said system being a lead weight responsive to gravitational forces. The view likewise portrays the pitch limit stop, the instrument face glass and the windowed indicator disk.

Figure 4:
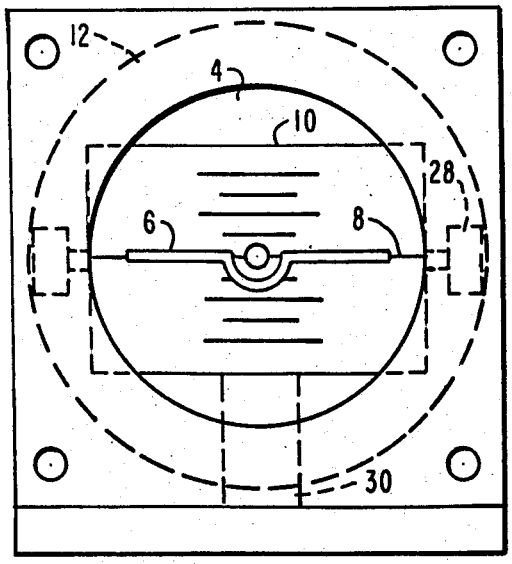

FIG. 4 portrays the basic flight instrument indicator face, the windowed indicator disk, the aircraft rear view silhouette, the pitch responsive, roll responsive indicator drum, the sky earth demarcation line and pitch reference marks.

Figure 5:
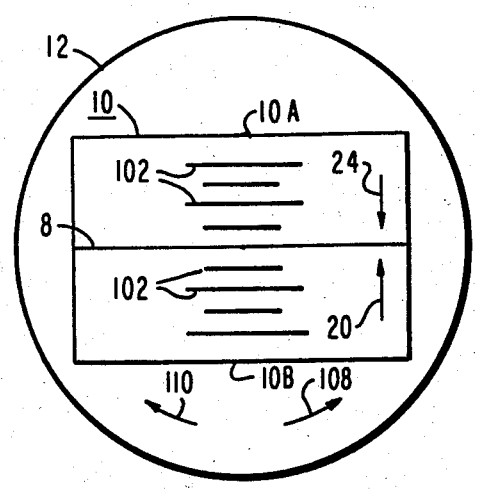

FIG. 5 illustrates the indicator disk, indicator drum, the sky earth demarcation line and the pitch reference marks.

Figure 6:
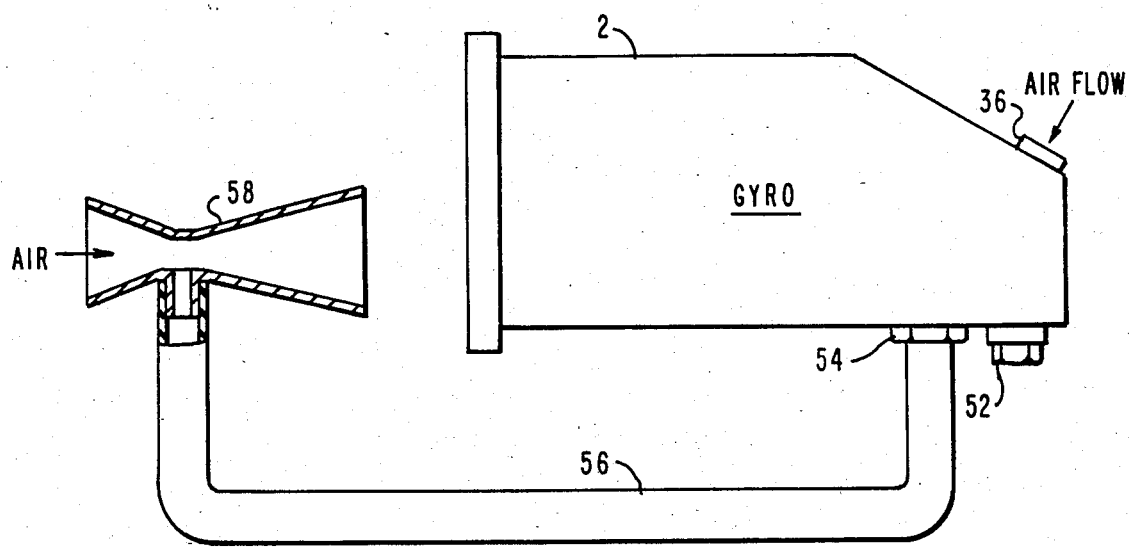

FIG. 6 is a side view of the basic flight instrument, its venturi vacuum source being portrayed in side section and the connective tubing. This view is indicative of the gyro being speed compensated only with the altitude compensator unit removed.

DETAILED DESCRIPTION OF THE INVENTION

Figure 1:
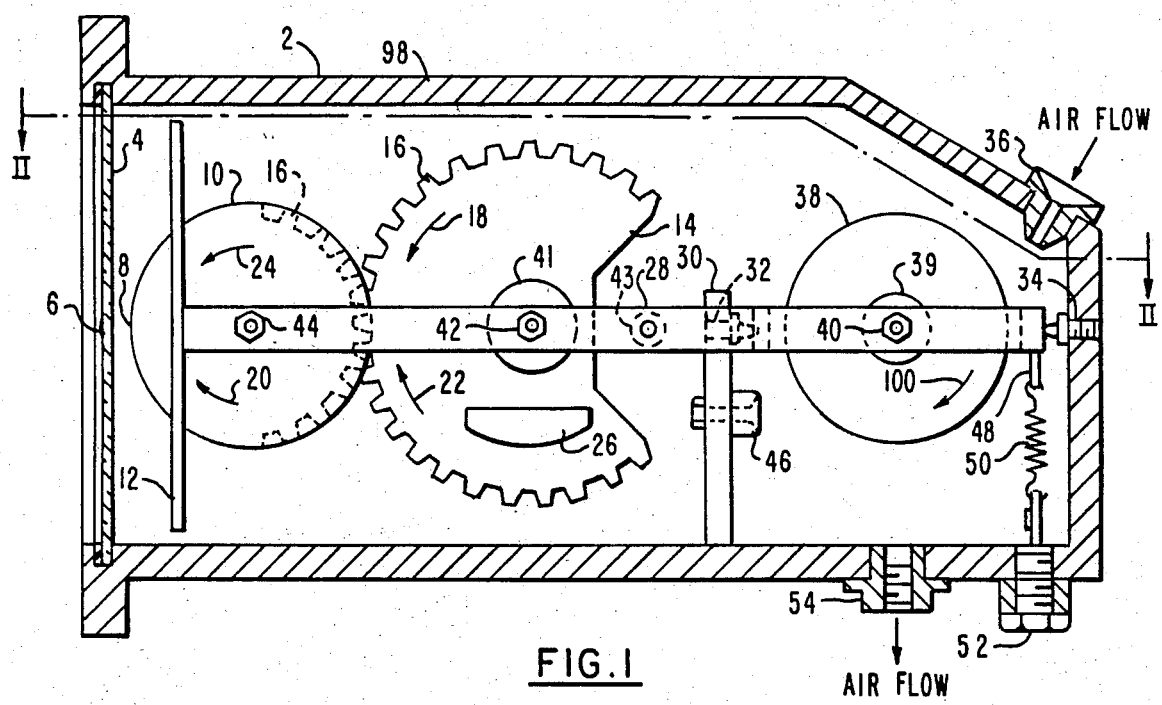

By reference to FIG. 1 we see a side view of the basic flight instrument 2, viewing face glass 4, aircraft rear view silhouette 6, sky earth demarcation line 8, indicator drum 10, windowed face disk 12, weighted gear 14, gear teeth 16, actuation movement arc arrows 18, 20, 22, 24, gear weight 26, gimbal cage 28, cage support stanchion 30, cage support pivots 32 and 34, air jet 36, gyro rotor wheel 38, axle shaft 39, shaft pivots 40, gear axle shaft 41, shaft pivots 42, gear limit stop 43, drum pivots 44, cage limit stop 46, cage erection arm 48, erection spring 50, erection spring tension adjuster cover cap 52, and vacuum line attach fitting 54.

Figure 2:
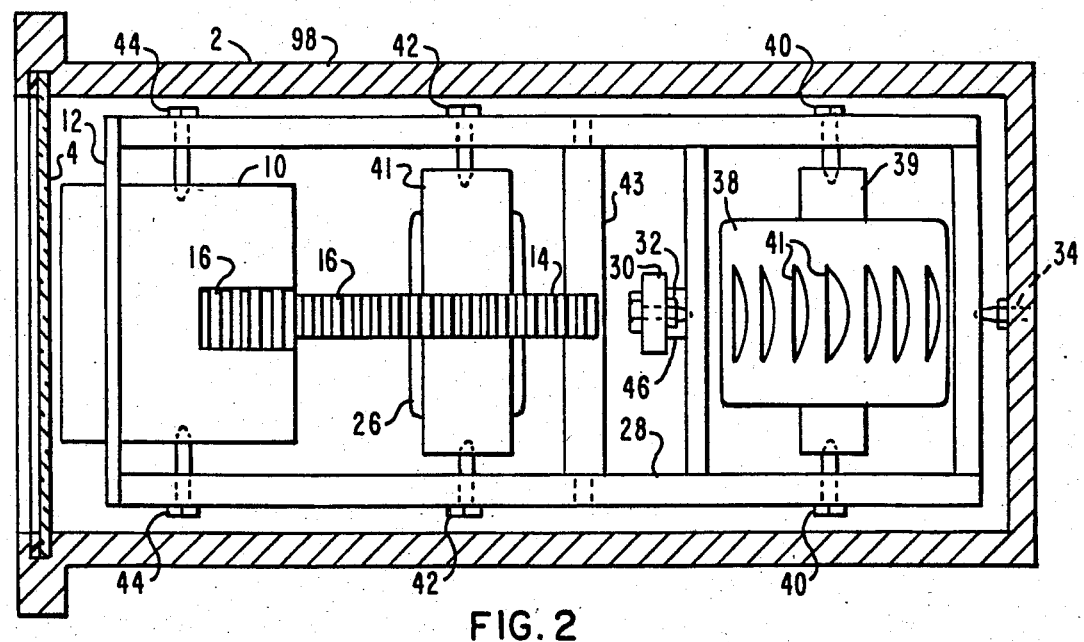
FIG. 2 is a top view of the basic flight instrument internal parts, the enclosure case being in section, said view portraying the air driven gyro rotor, the pitch responsive weighted drive gear, the driven indicator drum, the pitch limit stop, the roll limit stop, the windowed indicator disk and the indicator face glass.

By reference to FIG. 2 we see a top view of the basic flight instrument, component numerical numbers therein, predescribed in description of FIG. 1.

Figure 3:
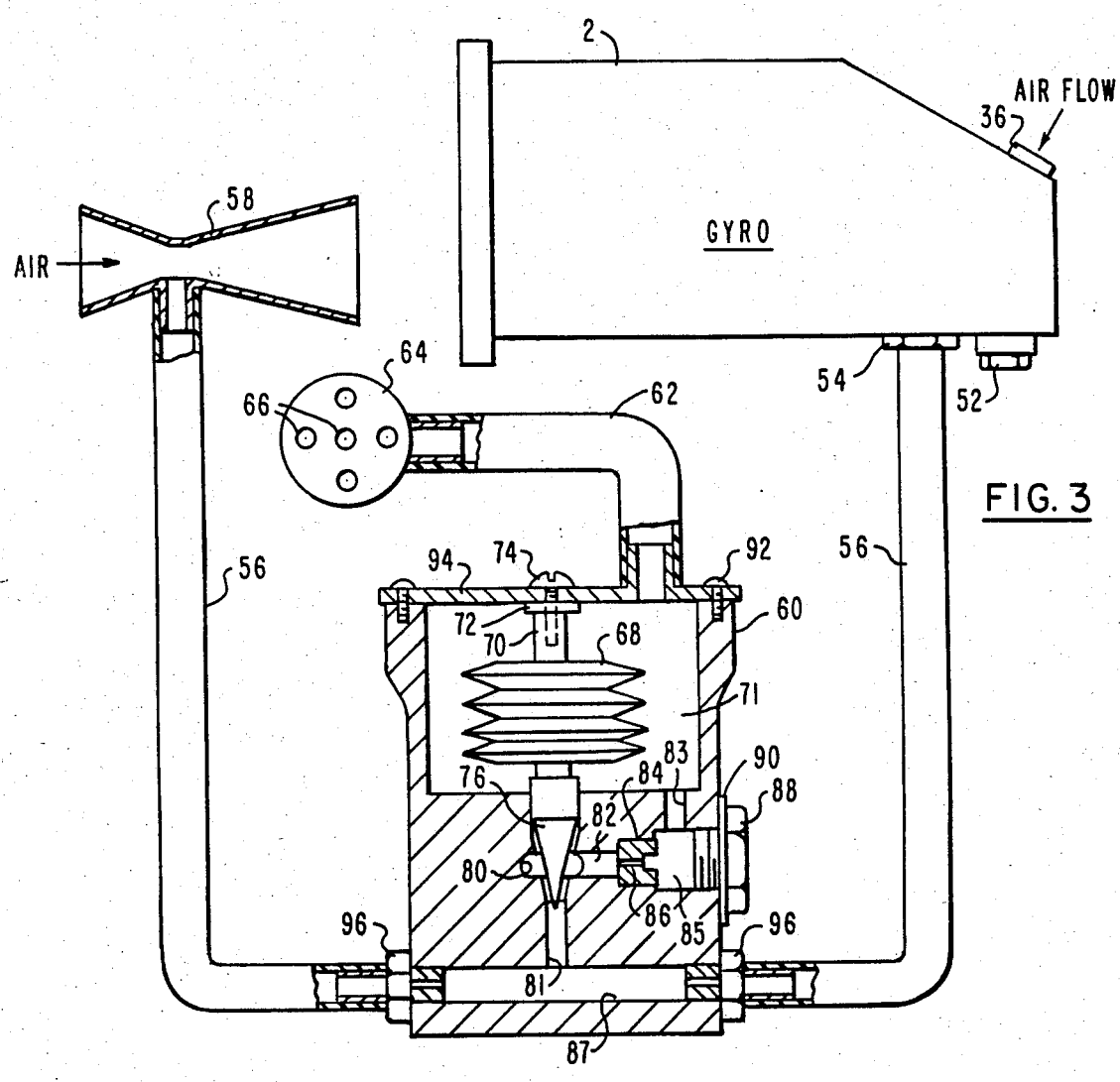
FIG. 3 illustrates the gyro, a side sectional view of a venturi, said venturi being the vacuum source, a sectional view of the altitude compensator unit, internal component parts of said compensator unit, a side view of the aircraft static port and connective tubing for the predescribed units.

FIG. 3 illustrates the basic flight instrument in an operational layout comprising an altitude compensation unit and venturi, wherein, units are serially connected thereby to effect operation thereof, wherein, we see gyro 2, air jet 36, cover cap 52, vacuum line attach fitting 54, interconnect tubing 56, venturi 58, altitude compensation unit 60, interconnect tubing 62, static port flush mounting plate 64, static port holes 66, aneroid unit 68, aneroid mounting shaft 70, air chamber 71, adjustment datum washer 72, mounting screw 74, needle valve 76, annulus 80, air passageway 81, 82 and 83, air bleed 84, air passageway 85, air bleed passageway 86, air passageway 87, cover cap 88, gasket washer 90, screw 92, cover plate 94, and vacuum line fitting 96.

FIG. 4 illustrates the front viewing face of the basic flight instrument, windowed disk 12, drum 10, glass face 4, aircraft rear view silhouette 6, sky earth demarcation line 8, gimbal cage 28, and cage support stanchion 30.

FIG. 5 illustrates windowed disk 12, indicator drum 10, sky blue 10A, black earth 10B, sky earth horizon demarcation line 8, pitch reference marks 102, roll direction indicator arrows 108 and 110 and pitch drum movement arrows 20 and 24.

FIG. 6 illustrates the basic flight instrument in an operational mode of speed compensation only, portraying gyro 2, air jet 36, cap cover 52, vacuum line fitting 54, connective tubing 56 and venturi 58.

OPERATION

In operation the Basic Flight Instrument will be located upon the instrument panel of the aircraft, wherein, by reference thereto, the pilot may determine his or her flight situation with regard to roll and or pitch. Referring to FIG. 1, we see the Basic Flight Instrument 2, wherein by application of a vacuum at port fitting 54, vacuum buildup within the gyro case will cause air flow induction into air jet 36, thereby spinning gyro rotor wheel 38, spinning directional reference arrow 100, said spinning will result in gyro rigidity, wherein should the aircraft roll to one side or the other thus begin to turn, said turn about the vertical axis of the aircraft will cause the gyro to precess, therefore indicate a roll to the pilot, said indication of the disk 12 drum 8 combination being transmitted by gimbal cage 28, wherein the deflection of the cage will be restrained by erection spring 50, connectable to cage arm 48, the tension of spring 50 will be adjustable by removable cover cap 52. Cage 28 deflection will be limited to 45 degrees either side by limit stop 46 thus preventing tumble. Again referring to FIG. 1, we see indicator drum 10, said drum possessing recessed gear teeth, whereby said drum will receive rotational input from weighted drive gear 14, by means of gear teeth 16 of drum and weighted drive gear being in mesh, rotation of said meshed units being responsive to gravitational influence upon the lead weight 26 fixably attached to the bottom of drive gear 14. In operation should the nose of the aircraft pitch up, lead weight 26 will respond to gravitational influence, therefore, gear 14 will rotate in accordance with arrow 22, whereby, drum 10 geared thereto will rotate in accordance to arrow 24, likewise, obviously, horizon sky earth demarcation line 8 will rotate downward relative to aircraft rear view silhouette 6, thereby portraying a pitch up into the sky blue of the instrument, whereby the pilot may determine his or her pitch reference situation comparative to pitch reference marks 102 FIG. 5. The exact opposite will occur should the nose of the aircraft pitch down, gear 14 will rotate in accordance with arrow 18, drum 10 being responsive thereto will rotate in accordance with arrow 20, demarcation line 8 will rotate upward portraying black earth behind silhouette 6, said silhouette being etched into the glass face 4 of the instrument, whereby by comparative reference to pitch marks 102 FIG. 5, the pilot may determine his or her pitch down situation. Weighted gear 14 is provided with a limit stop 43, thereby preventing indication in excess of 45 degrees either pitch up or pitch down. By reference to FIG. 2, we see a top view of the basic flight instrument, units portrayed being operationally predescribed by description of FIG. 1. The pitch erection system is obviously tumble free due to limit stop 43 FIG. 1 and FIG. 2.

FIG. 3 illustrates an operational layout of the basic flight instrument and appended equipment wherein by means of apparatus comprising of an airstream responsive venturi 58 and an altitude compensation unit 60, serially connected to the basic flight instrument 2 by connective tubing 56, we derive a flight instrument the indication of which is closely congruent to the roll indication of a gyro horizon. The rate gyro although the most trustworthy is plagued by an insideous problem that being congruency is only achieved at one given speed for a given rate of turn, therefore, to maintain congruency of indication to that of the natural horizon, should the speed of the aircraft change, then it will be required to change the deflective sensitivity of the gyro to guarantee a congruent response. In operation the gyro will respond as follows: Venturi 58 will be so located upon the aircraft that it will be under the influence of undisturbed relative airflow past the aircraft during flight, therefore responsive thereto. The venturi will be purposely oversized so as by design it will produce a greater vacuum pressure than required for speed compensation only. The excess vacuum capability will be diluted by static air induction by the altitude compensation unit 60, said dilution being proportional to the altitude of encounter.

Obviously as the speed of the aircraft increases, airflow thru the venturi will likewise increase therefore the venturi will produce an increased amount of vacuum pressure, whereby, air flow thru air jet 36 will increase with a resultant increse in gyro rotor spin RPM, thereby greater gyro rigidity, therefore, greater deflective sensitivity of the gyro due to precession. The exact opposite will occur should the airspeed reduce. Gyro deflective sensitivity is obviously in accordance with and proportional to the air flow thru the venturi 58. Another problem that exists is the fact that the vacuum produced by the venturi 58 is proportional to indicated airspeed and not true airspeed as is desired, so, altitude compensation is desirable at high altitudes due to the fact that a wide margin exists between true and indicated airspeeds at said high altitudes, conversely, at low altitudes true airspeed and indicated airspeeds are nearly matched.

The altitude compensator therefore will induce a large amount of bleed air at low altitudes, progressively reducing the bleed as the altitude increases, thereby, producing a reduction of vacuum at low altitudes and an increase of vacuum at high altitudes. This will occur as follows: Aneroid bellows unit 68 will be responsive to changes of static air pressure, said pressure entering thru static holes 66 drilled into static mounting plate 64, said pressure will pass thru connective tubing 62 into air chamber 71. Aneroid 68 will respond to air pressure changes, likewise will the needle valve 76 thereto attached, whereby said needle valve and its respective seat will control the induction of bleed air, said bleed air being static outside atmospheric from chamber 71, thru passageway 83, 85, thru bleed orifice 86, thru passageway 82, into annulus 80, passing around and thru the airspace between the needle valve and its respective seat, said needle valve 76 controlling induction airflow into passageway 81, thereby into passageway 87, whereby, proper vacuum dilution will be achieved, wherein, gyro deflective response will now be likewise in accordance with and proportional to changes of altitude.

Obviously bleed orifice 86 could be enlarged or reduced as desired or required so as to enhance congruency of gyro indication as compared to the natural horizon, likewise datum spacer flat washer thickness could be changed for the same purpose. FIG. 4 and FIG. 5 both illustrate the display face portrayed to the pilot, viewing face glass 4, aircraft rear view silhouette 6 etched onto the surface of glass face 4, sky earth horizon demarcation line 8, display drum 10, sky blue coloration 10A, black earth coloration 10B, windowed disk 12, pitch responsive directional arrows 20 and 24, response arrow 24 during pitch up, response arrow 20 during pitch down, roll response arrows 108 and 110, response arrow 110 is the roll response of the indicator during a left turn, response arrow 108 is the roll response of the indicator during a right turn. Pitch reference marks 102 are for use by the pilot for comparative reference to the rear view silhouette so as he or she may determine the pitch situation.

Reference 28 FIG. 4, illustrates the ends of the extension arms of the gimbal cage, wherein, disk 12 is thereto attached therefore responsive thereto.

FIG. 6 illustrates the operational layout of the basic flight instrument in the mode of speed compensation only with the altitude compensation unit removed. In this configuration, venturi 58 will be properly sized, wherein, by proper sizing of the venturi a high degree of congruency of indication to that of the natural horizon will be achieved but only a low altitudes. By use of this configuration the basic flight instrument will obviously be speed compensated as predescribed by discription of FIG. 3.

NOTE: It will be understood but not shown that the axel shafts of the gyro rotor wheel, the weighted drive gear and the indicator drum FIG. 2 may be reconfigured to that which is more common to the state of the art, wherein, they would possess an axle shaft passing thru the entire unit, pivot points ground on both ends of said shafts, said pivots extending into the gimbal cage side rails, wherein the axel shaft pivot ends will be retained by ball bearings, said bearings being adjustable so as to remove end and side play and to minimize frictional drag. This is probably a more desirable configuration than that portrayed in FIG. 2.

What I claim:

1. A basic flight instrument comprising a vertical axis referenced rate gyro in combination with a display drum, said drum possessing a horizon demarcation line, wherein, by comparative reference of said line to an aircraft silhouette etched into the glass display face of the basic instrument the pilot may determine roll and or pitch for determination of his or her flight situation, whereby, roll erection will be provided by a gimbal cage erection spring, said cage being 45 degree deflective limited and pitch erection accomplished by the drum rotation receiving reversal input from a lead weighted drive gear, said weight being responsive to the gravitational tug force of the earth, said display drum rotation will be pitch limited to a maximum of 45 degrees, whereby said basic instrument will be totally free of possible tumble.

2. In accordance with claim 1, the gyro rotor may receive spin power derived from a source of either electricity or air driven.

3. In accordance with claim 1, an apparatus comprising a basic flight instrument, a venturi and connective tubing, serially connected therewith, wherein, said venturi is so situated as to lie within the realm of undisturbed airflow past the aircraft, whereby, should the speed of the craft increase, the airflow thru the venturi will likewise increase with an obvious resultant increase in the vacuum applied to the connective tubing, thereby, likewise, a vacuum increase applied to the case of the basic flight instrument, thereby, a resultant increase in airflow thru a jet nozzle, said airflow directed at gyro rotor buckets, thereby, a resultant increase in gyro rotor RPM in response thereto, wherein, gyro deflective sensitivity will likewise increase, conversely, the exact opposite will occur should the speed of the aircraft decrease, therefore, as speed compensation is highly desireable, it is easily accomplished by use of a simple venturi, whereby, in use, the horizon demarcation line will remain more closely congruent to that of the natural horizon.

4. In accordance with claim 1, pitch sensitivity may be amplified if desired, merely by increasing the circumference of the weighted drive gear as compared to the circumference of the display drum, geared thereto.

5. In accordance with claim 1, altitude compensation may be desirable should operation extend over a wide range of altitudes, therefore, if incorporated, the apparatus will comprise a venturi, purposely oversized, an altitude compensator unit and a basic flight instrument, wherein, the altitude compensator unit will be placed in the vacuum supply line between the venturi and the basic flight instrument, wherein, said altitude compensator unit will control the induction of static bleed air into the vacuum supply line, said induction rate being proportional to and in accordance with the altitude of encounter, whereby, at low altitudes a considerable amount of static air will be induced into the vacuum line, thereby, a reduction of applied vacuum to the gyro, likewise, a reduction of gyro spin RPM therefore less gyro deflective sensitivity, conversely, at high altitudes the exact opposite will occur, wherein, the static air pressure entering thru the aircraft static port into the altitude compensator unit will lessen as aircraft altitude increases, wherein, an aneroid bellows within the unit will expand in response thereto, wherein, a needle valve thereto attached will reduce the induction of bleed air into the vacuum line, said bleed air passing thru a controlling bleed jet insert, into an annulus circumscribing the central portion of the needle seat, between said seat and its respective needle, thru a passage connectable by tee into the vacuum line, therefore, said reduction of bleed induction will result in an increase of applied vacuum, wherein, the gyro spin RPM will increase in response thereto, likewise, the gyro deflective sensitivity will also increase, wherein, by its use in conjunction with speed compensation, the congruency of the horizon demarcation line relative to the natural horizon will be improved, wherein, the desired closure rate of the needle to its respective seat may be achieved by a change of aneroid resiliency, said resiliency being proportional to aneroid diameter, number of layers comprising the bellows, metal thickness of the aneroid structure and brinell hardness of the structure, wherein, further fine tuning of static bleed air induction rate may be achieved by changing the bleed jet insert to one of a larger or smaller jet and or bellows datum spacer washer thickness change, wherein, by proper selection of the predescribed, a higher degree of congruency may be achieved.

* * * * *